United States Patent [19]

Newsom

[11] Patent Number: 4,997,511
[45] Date of Patent: Mar. 5, 1991

[54] TUBULAR AUTOCLAVE FOR CURING COMPOSITE PARTS

[76] Inventor: Cosby M. Newsom, 15517 S. Seaforth Ave., Norwalk, Calif. 90650

[21] Appl. No.: 472,794

[22] Filed: Jan. 31, 1990

Related U.S. Application Data

[63] Continuation-in-part of Ser. No. 188,831, May 2, 1988, abandoned.

[51] Int. Cl.$^5$ .............................................. B32B 31/20
[52] U.S. Cl. ...................................... 156/382; 100/211; 156/285; 156/583.3; 249/65; 264/102; 425/389
[58] Field of Search ............... 264/531, 544, 545, 552, 264/573, 257, 102, 101, 553; 156/382, 583.3, 381, 285; 425/389, 405.1, 405.2; 43/18.5; 249/65; 100/211

[56] References Cited

U.S. PATENT DOCUMENTS

| | | | |
|---|---|---|---|
| 2,477,188 | 7/1949 | Hemming | 156/382 |
| 2,737,998 | 3/1956 | Meanor et al. | 43/18.5 X |
| 3,964,846 | 6/1976 | Bliss | 249/65 X |
| 4,126,659 | 11/1978 | Blad | 264/573 |
| 4,541,891 | 9/1985 | Leatherman | 156/382 X |

Primary Examiner—Michael W. Ball
Assistant Examiner—Michele K. Yoder
Attorney, Agent, or Firm—Cislo & Thomas

[57] ABSTRACT

A method and apparatus for mass producing composite products comprising a novel autoclave having a cylindrical vacuum chamber; a cylindrical compression chamber surrounding the vacuum chamber; a reusable, flexible diaphragm defining the boundary between the chambers; and means for supplying heat and pressure between the diaphragm and the compression chamber. A core or mandrel is wrapped with a fiber-reinforced resin and is placed in the autoclave within the flexible diaphragm. Alternatively, a part layup can be sandwiched between an elastomeric caul and a hard tool by wrapping with expendable shrink tape to accommodate a variety of part shapes having constant or nearly constant cross sections throughout their length. The autoclave is then sealed and evacuated, causing the diaphragm to compress the resin layer against its core or mandrel due to atmospheric or higher pressure in the compression chamber. The autoclave is then heated to cure the resin. Subsequently, the autoclave is unsealed and the finished product is removed, with the autoclave immediately available for reuse.

12 Claims, 3 Drawing Sheets

TUBULAR AUTOCLAVE FOR CURING COMPOSITE PARTSCROSS REFERENCE TO RELATED APPLICATION

This application is a continuation-in-part of co-pending application Ser. No. 07/188,831, filed May 2, 1988, now abandoned, by the same applicant as for the present application.

BACKGROUND OF THE INVENTION

This invention relates to vacuum curing methods and apparatus and is particularly directed to methods and apparatus for vacuum curing tubular or cylindrical products.

In the manufacture of composite parts, such as drive shafts, fishing rods, vaulting poles, golf club shafts, arrows, and gun barrel reinforcements, such parts are generally formed by wrapping a mandrel or part core with a layer of fiber reinforced thermosetting resin and subjecting this assembly to heat and pressure to cure the resin. A typical prior-art curing method has called for applying an overlay wrap of shrink tape to the assembly to compress the resin laminate against its core or mandrel during heat curing in an oven.

Where higher quality parts have been required, another prior-art curing technique has called for placing the assembly in a vacuum-tight bag, placing the bag in an autoclave, and pulling a vacuum within the bag during the heat curing operation. With this procedure, the vacuum allows atmospheric pressure to compress the laminate against its mandrel or core and also removes hot air and other volatile material trapped within the laminate. This and the addition of autoclave pressure results in a denser product. However, the vacuum bags or shrink tape employed in these prior-art methods are used only once and then are discarded. Furthermore, prior-art autoclaves have been expensive to purchase and operate. Consequently, the cost of such prior-art curing methods has been considerable and they have been employed only when top-quality laminates are required Obviously, this means that parts produced by these prior-art techniques have been extremely expensive and have been produced only in limited quantities.

These disadvantages of the prior-art are overcome with the present invention and an improved method and apparatus are provided for heat and vacuum curing resin laminates which greatly reduces the cost of vacuum autoclaving such parts and which permits repeated and rapid reuse of the autoclave, thereby permitting relative mass production of high-quality laminate products and greatly reducing the cost of producing such products. A large variety of part shapes can be accommodated by the present invention.

The advantages of the present invention are preferably attained by providing a novel autoclave comprising a cylindrical vacuum chamber, a cylindrical compression chamber surrounding the vacuum chamber, a reusable, flexible diaphragm defining the boundary between said chambers and means for supplying heat and pressure between the diaphragm and the compression chamber. A core or mandrel is wrapped with a fiber-reinforced resin and is placed in the autoclave within the flexible diaphragm. Alternatively, a part layup can be sandwiched between an elastomeric caul and a hard tool by wrapping with expendable shrink tape to accommodate a variety of part shapes. The autoclave is then sealed and evacuated, causing the diaphragm to compress the resin layer against its core or mandrel due to atmospheric or higher pressure in the compression chamber. The autoclave is then heated to cure the resin. Subsequently, the autoclave is unsealed and the finished product is removed, while the autoclave is immediately available for reuse.

A search in the U.S. Patent Office has revealed the following patents:

| U.S. Pat. No. | Inventor | Issue Date |
| --- | --- | --- |
| 3,458,966 | S. G. Dunbar et al. | Aug. 5, 1969 |
| 3,921,273 | K. Kondo et al. | Nov. 25, 1975 |
| 4,101,364 | Tsukada | Jul. 18, 1978 |
| 4,216,047 | Hilliard | Aug. 5, 1980 |
| 4,269,644 | L. C. Goldstein | May 26, 1981 |
| 4,270,964 | Flaskett | Jun. 2, 1981 |
| 4,418,514 | D. C. Spann | Dec. 6, 1983 |
| 4,581,804 | McLaughlin | Apr. 15, 1986 |
| 4,583,347 | B. Neilsen | Apr. 22, 1986 |
| 4,596,111 | C. J. Ambrose | Jun. 24, 1986 |
| 4,609,102 | A. S. Blum | Sep. 2, 1986 |
| 4,666,551 | T. Soberay et al. | May 19, 1987 |

The patent to McLaughlin, U.S. Pat. No. 4,581,804, is directed to a method for making insulated pipe. In this reference, the outer pipe 22 is some type of filament-wound plastic pipe and protects the insulation layer 12 from external damage. When the outer pipe 22 and the inner carrier pipe are in alignment, a vacuum is broken by cutting the ends of the bag 18 which allows a compressed resilient insulation layer to expand and fill the annulus between the pipes. In this method, McLaughlin places a closed flexible bag around the carrier pipe and the insulating layer and draws a vacuum on the interior of the bag to compress the insulating layer. However, since the bag 18 is cut during this process, the bag 18 obviously is not reusable, as is the flexible diaphragm of the present invention.

The patent to Tsukada, U.S. Pat. No. 4,101,364, relates to a method and apparatus for producing a film-laminated plate. In this reference, a film is placed on a base plate in an evacuated lamination chamber and the film is then pressed onto the plate for lamination. However, the method and apparatus of this reference are inappropriate for producing tubular or cylindrical products, whereas the present invention is specifically directed to the production of tubular or cylindrical products.

The patent to Hilliard, U.S. Pat. No. 4,216,047, is directed to what is called "no-bleed" curing of composites. However, the method of this reference is clearly more complicated and expensive to perform than that of the present invention.

The patent to Flaskett, U.S. Pat. No. 4,270,964, relates to a method and apparatus for reinforcing a layer of plastic material by applying fibrous reinforcements to a thermoformed plastic sheet. Air is drawn from an outlet and a partial vacuum is formed between a plastic membrane and an upper surface of the plastic sheet. Again, the method of this reference is directed to the production of sheet material and would not be appropriate for producing tubular or cylindrical products, as is the present invention.

The remaining patents appear to be only generally related to the method and apparatus of the present invention.

Accordingly, it is an object of the present invention to provide improved methods and apparatus for curing tubular or cylindrical products formed of composite materials.

Another object of the present invention is to provide methods and apparatus for substantially reducing the cost of curing tubular or cylindrical products formed of composite materials.

A further object of the present invention is to provide methods and apparatus for mass producing high-quality tubular or cylindrical products formed of composite materials.

An additional object of the present invention is to provide a novel autoclave and a method of using the autoclave for producing tubular or cylindrical products formed of composite materials.

A specific object of the present invention is to provide a novel autoclave comprising a cylindrical outer tube, a resilient sleeve having outwardly flanged upper and lower end portions joined by a central tubular portion dividing the interior of the tube into an annular compression chamber and a central vacuum chamber, top and bottom cover means engageable with the flanged portions of the sleeve to realeasably seal the ends of the autoclave, means extending through the cover means for evacuating the vacuum chamber, and means extending through the outer tube for delivering heat and pressure to the compression chamber Another specific object of the present invention is to provide a novel method of producing tubular or cylindrical products formed of composite materials; the method comprising the steps of providing an autoclave having a cylindrical outer tube, a resilient sleeve having outwardly flanged upper and lower end portions joined by a central tubular portion dividing the interior of the tube into an annular compression chamber and a central vacuum chamber, top and bottom cover means engageable with the flanged portions of the sleeve to releasably seal the ends of the autoclave, means extending through the cover means for evacuating the vacuum chamber, and means extending through the outer tube for delivering heat and pressure to the compression chamber; wrapping a core or mandrel with a fiber-reinforced resin to form an assembly; placing the assembly in the autoclave within the flexible diaphragm; sealing and evacuating the autoclave to cause the diaphragm to compress the resin layer against its core or mandrel due to atmospheric or higher pressure in the compression chamber; and heating the autoclave to cure the resin.

Yet another object of the present invention is to provide a novel method of producing cured composite parts having a constant or nearly constant cross section throughout their length, by forming a wrapped sandwich comprising a precisely machined hard tool having a rounded shape opposite the side on which the layup is placed, the part layup, and an elastomeric caul fitting loosely against the laid-up part, the resulting sandwich having a cylindrical shape suitable for insertion into the tubular autoclave of the present invention.

These and other objects and features of the present invention will be apparent from the following detailed description, taken with reference to the figures of the accompanying drawings

DETAILED DESCRIPTION OF THE INVENTION

Figure 1:
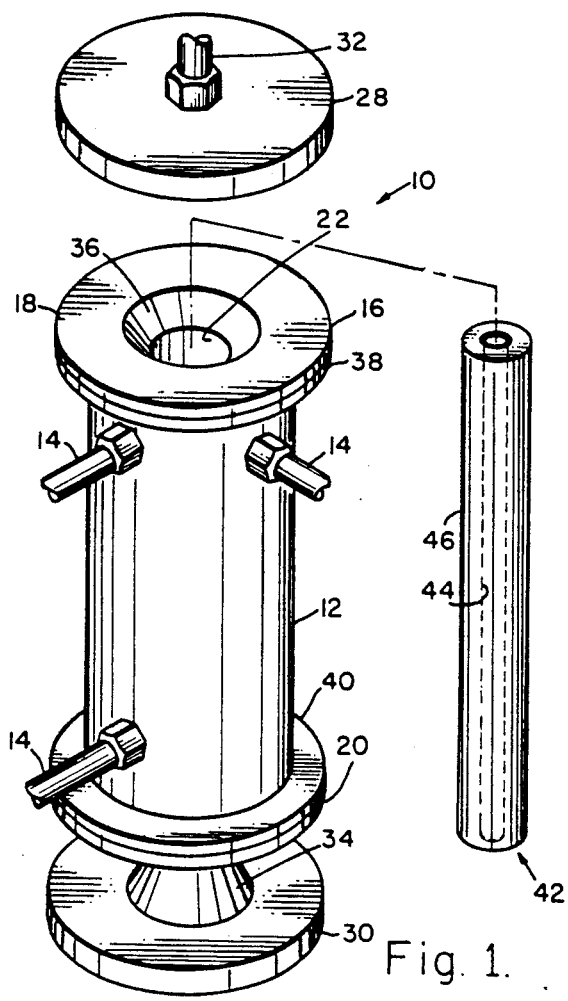
FIG. 1 is an exploded view of an autoclave embodying the present invention.
Figure 2:
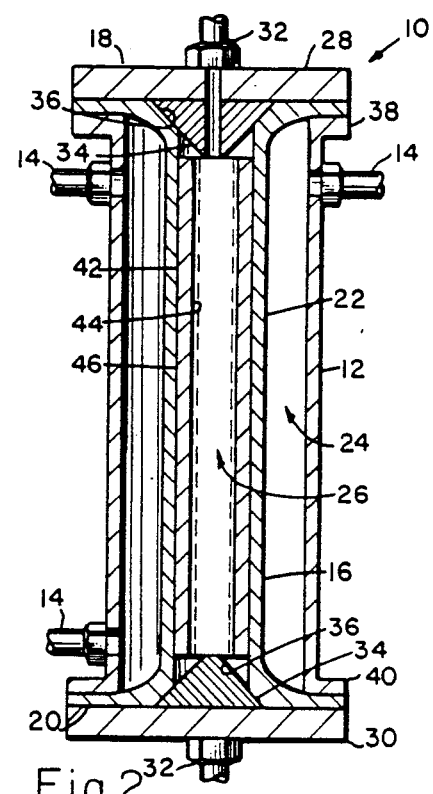
FIG. 2 is a vertical section through the autoclave of FIG. 1 showing the parts as positioned during the curing operation.
Figure 5:
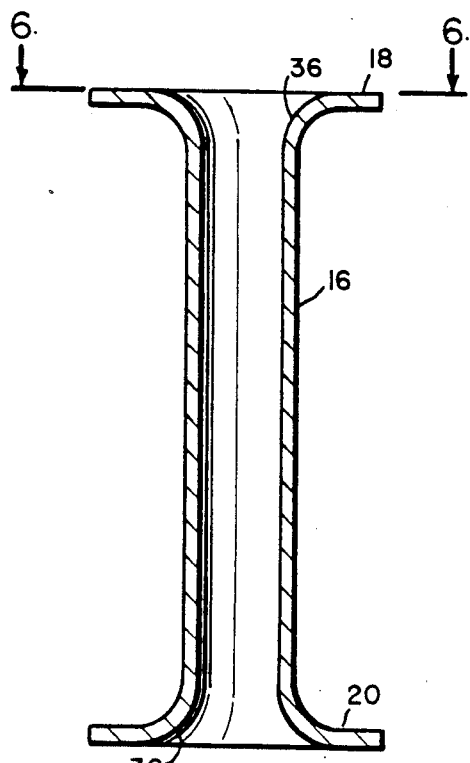
FIG. 5 is a vertical section through the resilient sleeve of the autoclave of FIG. 1.
Figure 7:
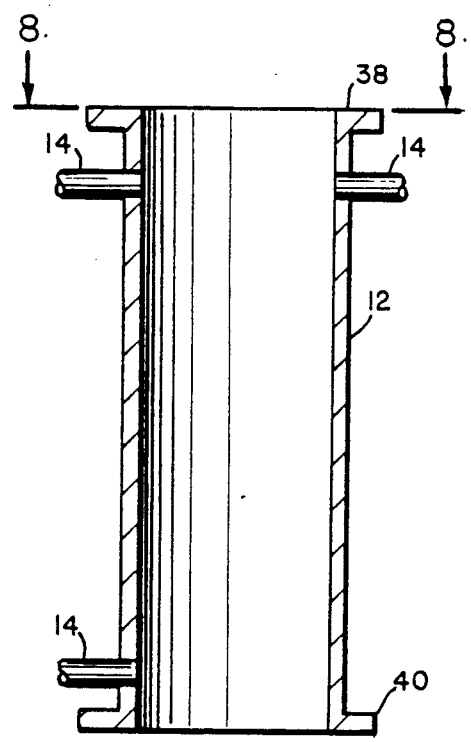
FIG. 7 is a vertical section through the outer tube of the autoclave of FIG. 1.
Figure 6:
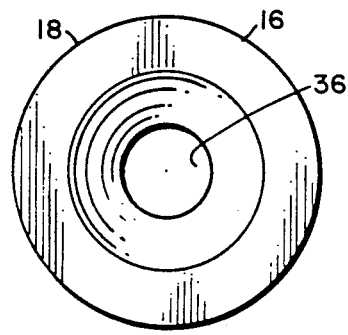
FIG. 6 is a top view of the resilient sleeve of FIG. 5.
Figure 8:
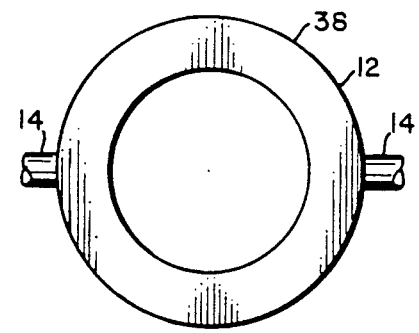
FIG. 8 is a top view of the outer tube of FIG. 7.
Figure 9:
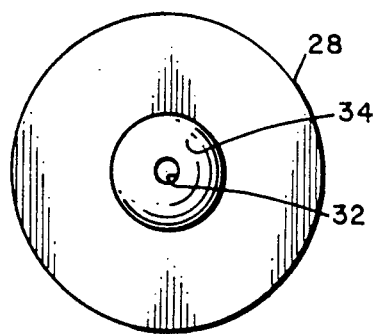
FIG. 9 is a bottom view of the top cover of the autoclave of FIG. 1.

In that form of the present invention chosen for purposes of illustration in the drawing, FIG. 1 shows an autoclave, indicated generally at 10, comprising a cylindrical outer tube 12 formed of rigid material, such as steel, and formed with coupling means 14 extending through the tube 12 to deliver heat and pressure to the interior of the tube 12. The outer tube 12 is best seen in FIGS. 1, 2, 7, and 8. A reusable, resilient sleeve 16 is mounted within the tube 12. Sleeve 16 is formed with upper and lower flanged portions, as seen at 18 and 20 respectively, joined by a central tubular portion 22 which serves to divide the interior of the outer tube 12 into an annular compression chamber 24 and a central vacuum chamber 26. The resilient sleeve 16 is best seen in FIGS. 2, 5 and 6. Top and bottom cover means, seen at 28 and 30, respectively, are releasably securable to the respective ends of the outer tube 12 to releasably seal the interior of the tube 12 during the curing operation.

The cover means 28 and 30 are substantially identical and are each provided with centrally mounted coupling means 32 which extend through the cover means 28 and 30 to permit evacuation of the vacuum chamber 26. The cover means 28 and 30 each have a conical projection 34 formed on the inner surface thereof surrounding the coupling 32 and mating with a conical recess 36 formed in the adjacent surface of the sleeve 16. The outer tube 12 is formed with upper and lower radial flanges, as seen at 38 and 40 respectively, which underlie the corresponding flanges 18 and 20 of sleeve 16. Flanged portions 18 and 20 of sleeve 16 are fixedly attached and sealed to the radial flanges 38 and 40 respectively of tube 12. An adhesive or clamping element (not shown) may be used to provide attachment between the components. To seal the autoclave 10, the top and bottom covers 28 and 30 are placed in position, as seen in FIG. 2, and are secured to the flanges 38 and 40 of the outer tube 12 by suitable clamping means, not shown.

Figure 3:
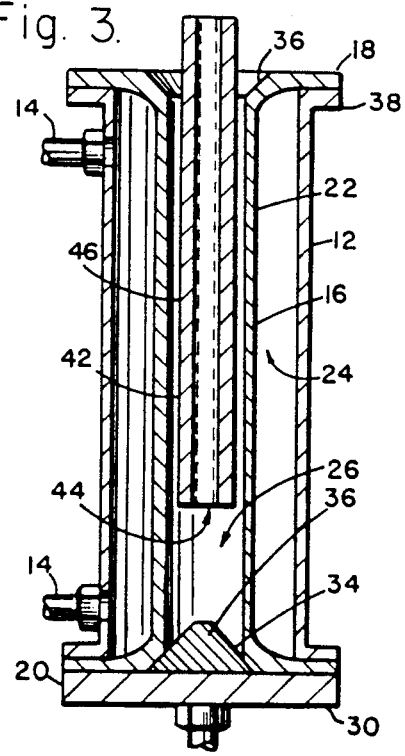
FIG. 3 is a view, similar to that of FIG. 2, showing the top cover of the autoclave removed to permit insertion of a workpiece to be cured.

In use, FIGS. 1, 2, 3 and 4 show a workpiece 42 comprising a central mandrel or core 44 wrapped with multiple layers of fiber-reinforced thermosetting or thermoplastic resin, as indicated at 46. To cure the resin wrapping 46 and form the workpiece into a composite product, the top cover 28 is removed, as seen in FIG. 3, and the workpiece 42 is inserted into the central vacuum chamber 26 within the reusable, resilient sleeve 16. The top cover 28 is then replaced and clamped to the upper flange 38 of the outer tube 12, while the bottom cover 30 is clamped to the lower flange 40 of the outer tube 12. This clamping compresses the upper flange 18 of the resilient sleeve 16 between the top cover 28 and the upper flange 38 of the outer tube 12 and compresses the lower flange 20 of the resilient sleeve 16 between the bottom cover 30 and the lower flange 40 of the outer tube 12 which seals the workpiece 42 within the autoclave 10, as seen in FIG. 2. The flanged portions 18 and 20 of sleeve 16 are resilient enough to act as a gasket between covers 28 and 30 and the radial flanges 38 and 40 of the outer tube 12 to insure a good seal.

Vacuum pumping means, not shown, are then connected to couplings 32 on the top and bottom covers 28 and 30 and serve to draw a vacuum within the central vacuum chamber 26. Since air at atmospheric pressure still resides in the compression chamber 24 between the resilient sleeve 16 and the outer tube 12, this air forces the resilient sleeve 16 to compress about the workpiece 42. At the same time, heat and, if desired, pressurized air are supplied through couplings 14 of outer tube 12 into the compression chamber 24 to heat the workpiece 42 to the curing temperature of the resin wrapping 46 and to cause outgassing of air or volatile materials entrained within the resin wrapping 46 and causing the resilient sleeve 16 to further compress the resin wrapping 46 against the mandrel or core 44 to form the workpiece 42 into a completed composite product.

Figure 4:
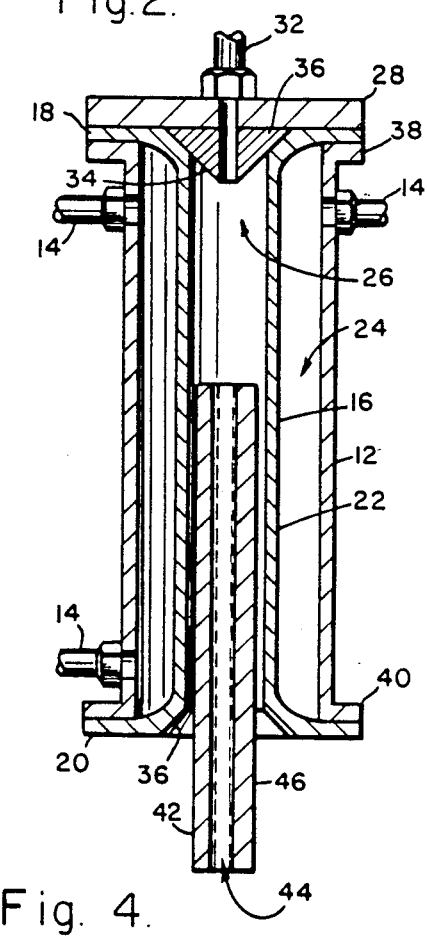
FIG. 4 is a view, similar to that of FIG. 2, showing the autoclave with the bottom cover removed to permit removal of a cured workpiece.

When the curing is complete, the heat and pressure are withdrawn from the compression chamber 24 through couplings 14 in the outer tube 12 and atmospheric pressure is admitted to the central vacuum chamber 26 through couplings 32 in the top and bottom covers 28 and 30. This serves to release the resilient sleeve 16 from pressing against the workpiece 42 and permits the workpiece 42 to be removed by removing the bottom cover 30, as seen in FIG. 4. Additionally, a vacuum can be applied to compression chamber 24 to further expand sleeve 16 and release the workpiece 42. Since the resilient sleeve 16 has not been cut or otherwise damaged by the curing operation, the autoclave 10 is immediately ready to receive another workpiece, such as the workpiece 42, for a subsequent curing operation. Thus, a plurality of workpieces, such as the workpiece 42, can be cured in rapid succession with the autoclave 10 and the cost of these curing operations will be greatly reduced, thereby permitting mass production of high-quality composite products at reasonable cost.

A production facility with a higher production rate could comprise a plurality of tubular autoclave units arranged in a circle. A dispensing device mounted above the autoclaves and designed to move in a circular path above them could feed prepared parts and tooling into the central chambers of successive autoclaves. A cured part would be ejected from a particular autoclave just before the dispensing device arrived above the open top end of the autoclave, which would then be ready to receive an uncured part to begin another curing cycle. The particular arrangement of the autoclaves, including the number of autoclaves and the diameter of the circle in which they were mounted, would depend on the desired production rate and on the length of cure required by the part. For example, a circle of 60 tubular autoclaves curing parts which required a 60-minute cure would yield one part per minute. Assuming 6-inch diameter flanges for the autoclaves, the circle would be under ten feet in diameter. The curing heat source and automation machinery for the production setup could be located within this circle The dispensing device holding the parts to be cured would move along a circular path above the circle of tubular autoclave units, loading prepared composite layups into the units automatically as required.

A curing cycle in one of the individual autoclave units of an automated setup would comprise the following events:

(1) loading—the top cover 28 of the unit would be opened and outer chamber 24 between outer tube 12 and resilient sleeve 16 would be evacuated to expand the inside diameter of sleeve 16 to accept the part and tooling from the dispensing device. The top cover 28 would then be closed and sealed, and outer chamber 24 would be vented to atmospheric pressure.

(2) curing—inner chamber 26 of the autoclave unit would be evacuated through coupling 32 of top cover 28. The outer chamber vent to the atmosphere would be closed. Heat and pressure applied within outer chamber 24 would act against resilient sleeve 16 to compress the part and tooling together for cure.

(3) unloading—all heat, pressure, and evacuation sources would be turned off and all chambers vented. Top cover 28 and bottom cover 30 would both be opened. Outer chamber 24 would then be evacuated to enlarge the center diameter of resilient tube 16 to release the cured part. Bottom cover 30 would then be closed and top cover 28 opened to allow a new part to be fed from the dispensing device which would arrive overhead above the autoclave at the proper time. The total curing cycle would then be complete.

A large variety of composite part shapes can be cured in the tubular autoclave of the present invention. So long as the composite part has either a constant cross section or one that changes only gradually throughout its length, it is possible to prepare a rounded cylindrical package for insertion into resilient sleeve 16 of the autoclave. It is only necessary that the hard tool have a rounded shape opposite the side on which the layup is placed.

Figure 10:
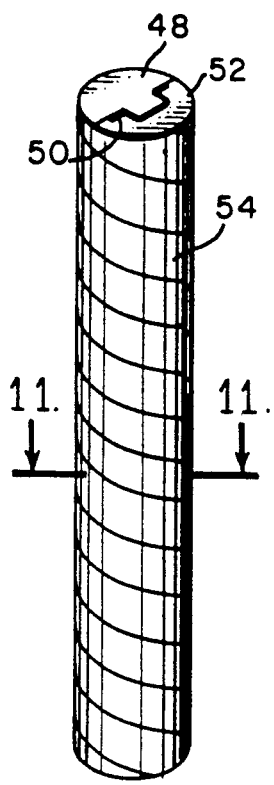
FIG. 10 is a perspective view of a wrapped part sandwich consisting of an elastomeric caul, the layup to be cured, and a hard tool having one rounded side.
Figure 11:
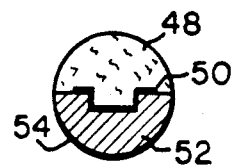
FIG. 11 is a cross sectional view as indicated in FIG. 10.
Figure 12:
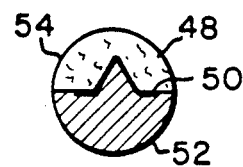
FIG. 12 is a cross sectional view of an arrangement similar to that shown in FIGS. 10 and 11 but with a different part shape.

As shown in FIG. 10, an elastomeric caul 48 fits loosely against the part layup 50 in its precisely dimensioned tool 52. A wrapping of expendable shrink tape 54 holds the sandwich composed of caul 50, part 52, and tool 54 together for insertion into inner chamber 26 of the autoclave. FIG. 11 shows the arrangement of FIG. 10 in cross section FIG. 12 shows a cross sectional view of a differently shaped but rounded cylindrical part. It is apparent from these two examples that a wide variety of shapes can be accommodated by the method of the present invention.

Obviously, numerous variations and modifications may be made to the autoclave without departing from the present invention. For example, only one of the autoclave covers 28 and 30 need be provided with a vacuum coupling. Similarly, only two couplings 14 in outer tube 12 could suffice for the pressurizing, evacuation, and heating functions if a suitable arrangement of valves were provided in plumbing exterior to the autoclave. Therefore, it should be clearly understood that the form of the present invention described above and shown in the figures of the accompanying drawings is illustrative only and is not intended to limit the scope of the present invention.

I claim:

1. An apparatus for holding and curing a laminate or wound filament workpiece comprising:
    a cylindrical outer tube having first and second open ends and including a plurality of coupling means mounted thereon for communicating between an outer surface and an inner surface of said outer tube;
    a resilient sleeve mounted concentrically inside said outer tube with first and second opposite, open ends, having upper and lower flanged portions joined by a central tubular portion, said sleeve serving to divide an interior volume of said outer tube into a generally cylindrical inner chamber and a generally annular outer chamber;
    a first cover means releasably mounted on said top flange portion of said sleeve, for closing off said first ends of said outer tube and said resilient sleeve, said first cover means having a first centrally mounted coupling means therein to allow communication with said inner chamber;
    a second cover means releasably mounted on said bottom flanged portion of said sleeve, for closing off said second ends of said outer tube and said resilient sleeve; and
    means for creating and maintaining a pressure differential between said inner and outer chambers, operatively connected to said apparatus;
    wherein a workpiece may be positioned in said inner chamber and subjected to said pressure differential.

2. The apparatus as claimed in claim 1, wherein said second cover means further comprises a second centrally mounted coupling means therein to allow communication with said inner chamber.

3. The apparatus as claimed in claim 2, wherein said means for creating and maintaining a pressure differential comprises means for evacuating said inner chamber, operatively connected to one of said centrally mounted coupling means in said first and second cover means.

4. The apparatus as claimed in claim 1, further comprising heat supplying means operatively connected to at least two of said plurality of coupling means, for supplying heat to said outer chamber.

5. The apparatus as claimed in claim, 1, wherein said means for creating and maintaining a pressure differential comprises means for creating and maintaining a higher than atmospheric pressure in said outer chamber operatively connected to said outer chamber through said plurality of coupling means in said outer tube.

6. The apparatus as claimed in claim 1, wherein said means for creating and maintaining a pressure differential between said inner and outer chambers comprises:
    means for evacuating said inner chamber, operatively connected to said first centrally mounted coupling means; and
    means for creating and maintaining a higher than atmospheric pressure inside said outer chamber, operatively connected to at least one of said plurality of coupling means on said outer tube.

7. The apparatus as claimed in claim 1, further comprising first and second conical recesses formed in first and second opposite ends of said resilient sleeve in said upper and lower flanged portions, and conical projections formed on surfaces of said first and second cover means facing said inner chamber, said projections having shapes mateable with said recesses in said resilient sleeve.

8. The apparatus as claimed in claim 1 wherein said means for creating and maintaining a pressure differential between said inner and outer chambers comprises means for evacuating said outer chamber, operatively connected to at least one of said plurality of coupling means.

9. An autoclave comprising:
    (a) a cylindrical outer tube,
    (b) a resilient sleeve having outwardly flanged upper and lower end portions joined by a central tubular portion dividing the interior of said outer tube into an annular compression chamber and a central vacuum chamber,
    (c) top and bottom cover means engageable with said flanged portions of said sleeve to releasably seal the ends of said autoclave,
    (d) means extending through said cover means for evacuating said chamber, and
    (e) means extending through said outer tube for delivering heat and pressure to said compression chamber.

10. The autoclave of claim 9 further comprising upper and lower radial flanges projecting from the respective ends of said outer tube to underlie said outwardly flanged upper and lower end portions of said resilient sleeve.

11. The autoclave of claim 9 further comprising:
    conical recesses formed in the outer surfaces of the opposite ends of said resilient sleeve, and conical projections formed on the inner surfaces of said cover members and mateable with said recesses in said resilient sleeve.

12. An apparatus for curing a laminate, comprising:
    (a) a first tube having flexible walls and first and second open ends;
    (b) a first movable plug positionable to prevent communication between the inside and outside of said first tube at said first open end of said first tube;
    (c) a second movable plug positionable to prevent communication between the inside and outside of said first tube at the second open end of said first tube;
    (d) a first movable plate which holds said first plug;
    (e) a second movable plate which holds said second plug;
    (f) a second tube concentric with and having a greater diameter than said first tube, axially disposed between said first and second plates to form a chamber between said first and second tubes; and
    (g) means communicating with the inside of said first tube for producing a pressure differential between said inner and outer tubes.

* * * * *